Figure 1:
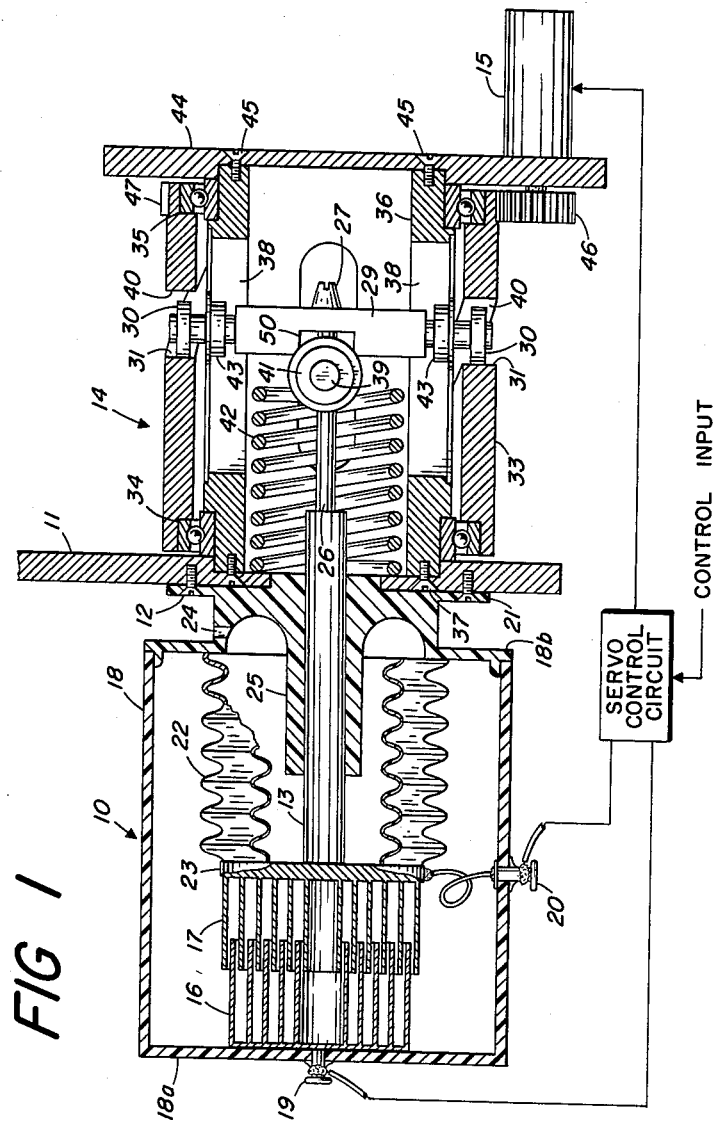

Aug. 27, 1963  V. J. GRONDAHL ETAL  3,101,622
BALANCED CONTROL CAM FOR A DRIVEN VACUUM VARIABLE CAPACITOR
Filed Jan. 15, 1962  2 Sheets-Sheet 1

INVENTORS
VINCENT J. GRONDAHL
FREDERICK W. JOHNSON
BY
*Moody and Kintzinger*
ATTORNEYS

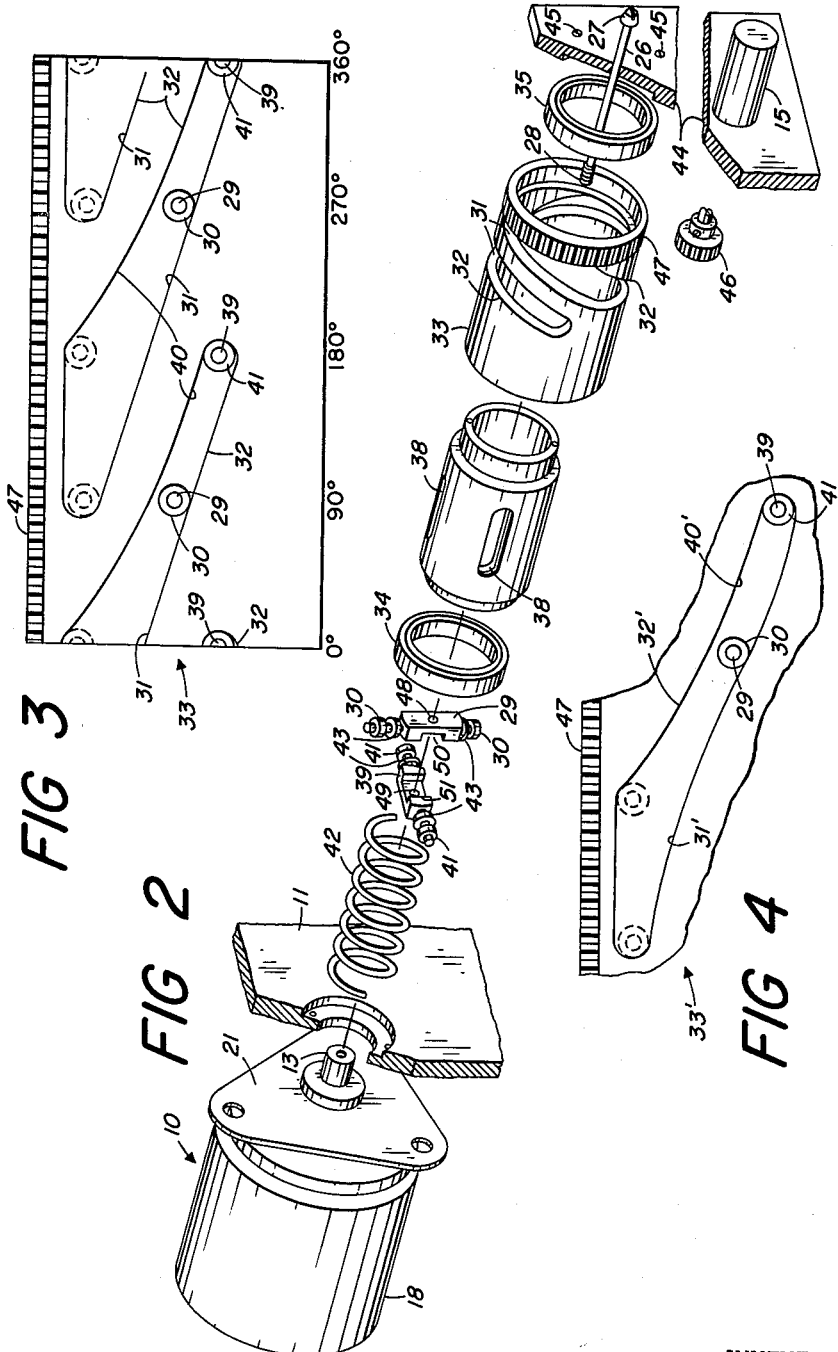

United States Patent Office 3,101,622
Patented Aug. 27, 1963

3,101,622
BALANCED CONTROL CAM FOR A DRIVEN VACUUM VARIABLE CAPACITOR
Vincent J. Grondahl, Hiawatha, and Frederick W. Johnson, Cedar Rapids, Iowa, assignors to Collins Radio Company, Cedar Rapids, Iowa, a corporation of Iowa
Filed Jan. 15, 1962, Ser. No. 166,110
4 Claims. (Cl. 74—89)

This invention relates in general to drive systems for setting devices, and in particular to a cam drive providing an output working against nonlinear force-displacement characteristics while supplied with a substantially uniform force drive input throughout its range of operation.

Many devices subject to variable setting and used in control, sensing, and tuning systems are servo drive positioned. Nonlinear force-displacement characteristics may be encountered through the range of position settings with such devices and it is a significant problem with many servo drive systems. To illustrate, it is convenient to consider a servo drive for a particular vacuum variable capacitor. The capacitor has two groups of concentrically arranged cylindrical capacitor plates which mesh together in the small spacings provided between the concentric cylindrical plates of the opposite group, respectively. The degree of mesh between the two groups of concentric cylinders determines the amount of capacitive reactance.

A shaft secured to one of the two groups of concentric cylindrical plates is useful in providing relative movement between the two groups of plates. The two groups of plates are encapsulated in a sealed unit made partly of insulating material and including a metallic bellows which permits movement in and out of the shaft while maintaining the seal. The force imposed on the shaft by the metallic bellows with atmospheric pressure on one side, an evacuated chamber on the other side, and resilient deflective force of the bellows itself may be a nonlinearly increasing force in opposition to movement of the shaft outwardly from the capacitor. This resistive force is found generally to increase in a manner similar to a rising exponential curve. If the load imposed by such resistive force is not counterbalanced completely out, or for that matter so balanced as to be substantially constant, the servo system may respond too slowly or too quickly and hunt.

It is, therefore, a principal object of this invention to so counterbalance nonlinear resistive force encountered in setting a device that the resultant force be substantially uniform throughout the range of operation.

A further object is to so counterbalance the resistive force encountered in setting a device that the power requirements for varying setting positions be substantially uniform and at a minimum throughout the range of operation.

Another object is to minimize power drive requirements for setting a device in both drive directions and throughout the range of operational settings.

Features of the invention, useful in accomplishing these objects, include a servo driven cam member having two distinctly different cam contours, two cam contour riders, and guide means for limiting motion of the cam riders to back and forth motion in a direction as driven by the cam member. One of the cam riders is connected to the setting drive linkage of the device and is continuously biased against one of the cam contours by unidirectional force exerted by the device. The other cam rider is continually biased into riding contact with the other cam contour by resiliently compressed spring means. The cam contour engaged by the cam rider connected to the setting drive linkage is shaped to provide predetermined device setting characteristics with motion of the cam member. If the device is a vacuum variable capacitor the setting cam contour may be such as to provide linear capacitance-displacement charcteristics or, if desired, to provide linear frequency shift in a variable capacitor tuned system. The other cam contour is such as to convert force of the resilient spring means acting through the other cam rider into a force imposed on the cam member in opposition to force imposed on the cam member by the device acting through the setting drive linkage cam rider on its cam contour. The other cam contour may be so shaped that the resistive force imposed on the cam member by the setting system of the device is completely counterbalanced. It may be so balanced that the driving force required in servo driving the cam member for moving the shaft in and out of the device is substantially constant throughout the range of operational settings.

A specific embodiment representing what is presently regarded as the best mode of carrying out the invention is illustrated in the accompanying drawings.

In the drawings:

FIGURE 1 represents a broken away and sectioned view of our counterbalance cam drive for setting devices as adapted for a servo drive system of a vacuum variable capacitor;

FIGURE 2, a perspective exploded view showing detail of the counterbalance cam drive system of FIGURE 1;

FIGURE 3, a view of the cylindrical cam member laid flat through 360 degrees for illustrating cam contour detail; and FIGURE 4, a partial flattened out view similar to FIGURE 3 showing another cam contour.

Referring to the drawings:

Vacuum variable capacitor 10 is mounted on wall 11 by screws 12 and is provided with setting shaft 13. This shaft 13 is connected through a force balancing control cam drive 14 to reversible servo motor drive 15 which is servo driven by an error sensing servo circuit, of a conventional nature, for setting the vacuum variable capacitor 10.

The vacuum variable capacitor 10 has concentrically cylindrical capacitor plates which are arranged in two groups of plates 16 and 17 as shown in FIGURE 1. The capacitor plates 16, mounted to the inside of case 18, and the capacitor plates 17, mounted on setting shaft 13, are arranged for meshing together in the small spacings provided between the concentric cylindrical plates of the opposite group of plates 16 or 17, respectively. Electrical terminals 19 and 20, which are electrically connected to plates 16 and 17, respectively, in a conventional manner, are provided on case member 18a. Case member 18b is provided with the flange 21 through which mounting screws 12 are passed for mounting the capacitor to wall 11.

Case members 18a and 18b, bellows 22, and the base 23 of capacitor plate group 17 form a sealed chamber which is evacuated in order that capacitor plate groups 16 and 17 will be in a vacuum. The other side of bellows 22, in this case the interior, is open to atmosphere through an opening 24 provided in case member 18b. An extended bearing 25 of case member 18b supports setting shaft 13 for relative longitudinal movement while maintaining alignment of capacitor plate group 17 for proper meshing with the capacitor plate group 16. Throughout the range of capacitor plate settings, atmospheric pressure acting through the bellows and resilient deflective force of the bellows itself results in a unidirectional biasing force tending to draw shaft 13 into the bellows. This is found to be a nonlinearly increasing force in opposition to movement of the shaft outwardly from the vacuum variable capacitor 10.

Referring also to FIGURE 2, an extension 26 is provided for shaft 13. Extension 26 has a slotted head 27 at one end and thread 28 at the other end for its mounting and to provide for application of the biasing force of shaft 13 through the head 27 to cam yoke 29. This force continuously biases the end rollers 30 of cam yoke 29 into riding engagement with lower cam contours 31 of the identical slots 32 offset 180 degrees from each other in cylindrical cam member 33. Cam member 33 is mounted by bearings 34 and 35 for rotation annularly about tubular guide member 36. This guide member 36 is mounted on wall 11 by screws 37 and is provided with longitudinally extended slots 38 which limit motion of cam yokes 29 and 39 to longitudinally directed movement along the axis of shaft 13 as driven by lower cam contours 31 and upper cam contours 40, respectively. Cam yoke 39 is provided with end rollers 41 which are continuously biased for riding engagement with upper cam contours 40 by helical compression spring 42 which is resiliently compressed between wall 11 and cam yoke 39. Rollers 43 of cam yokes 29 and 39 provide for free guided movement of the cam yokes along slots 38.

A bracket 44, mounted on the outer end of guide member 36 by screws 45, mounts the servo motor drive 15 including drive gear 46 which engages the gear teeth 47 of cam member 33. Cam member 33 is directionally driven as determined by the reversible drive servo. This servo motor drive 15 is wired for servo error corrective signal control in a servo circuit (detail not shown) including the terminals 19 and 20 of capacitor 10.

For vacuum variable capacitor 10 to be driven for linear capacitance change with displacement, lower cam contours 31 are substantially straight, as shown in FIGURE 3. Thus, the degree of mesh between capacitor plate groups 16 and 17 and the change of capacitance are linear with rotation of cam member 33. However, the resulting force imposed on cam member 33 by the nonlinear biasing force of the vacuum variable capacitor 10 through shaft 13 and cam yoke 29 is nonlinear. In order that this may be counterbalanced for improved servo drive characteristics the upper contours 40 of slots 32 are carefully shaped and a coil spring 42 of particular desired spring biasing force-displacement characteristics is chosen for cooperation with the upper cam contours 40. Contours 40 are so shaped and a spring 42 may be so chosen that the rotational force resultant imposed on cam member 33 is substantially constant throughout the range of operational settings. A spring 42 may be chosen and cam contours 40 so matched that the force component imposed by vacuum variable capacitor 10 through cam yoke 29 on cam member 33 is substantially completely counterbalanced.

In frequency tuning, frequency shift or error conforms substantially to the formula $$f = \frac{1}{2\pi\sqrt{LC}}$$

Hence, frequency shift is nonlinear with respect to capacitance shift in a variable capacitance tuned circuit, and if it is desired to have a linear frequency shift servo drive arrangement, then a lower nonlinear cam contour 31', as shown in FIGURE 4, must be used in place of contours 31. With this change in lower cam contours the forces imposed on cam member 33' by the capacitor 10 will vary from those imposed on cam member 33. Hence, it follows that the upper cam contours 40' must be suitably shaped and matched to a spring 42 for the desired counteracting forces. These forces are imposed by spring 42 acting through yoke 39 for obtaining the desired rotational resultant force balance, or substantially constant bias throughout the range of operational settings, such as obtained with the embodiment of FIGURE 3. The range of operational positions of cam yoke 29 and 39 for both the embodiments of FIGURES 3 and 4 extend from the outermost settings indicated in phantom to the innermost settings shown in solid. Further, it may be noted that lower cam contours 31' are shaped to provide increased cam yoke 29 motion when cam member 33' is being driven and yoke 29 is in motion from the outer position indicated in phantom to the inner position shown.

Shaft extension 26 helps maintain alignment of yokes 29 and 39 while they are acting as cam contour riders during rotation of cam member 33. This is accomplished with the shaft extension 26 extending through opening 48 of cam yoke 29 and through opening 49 of cam yoke 39. Cam yokes 29 and 39 are subject to relative longitudinal movement during rotation of cam member 33 while riding along cam contours 31 and 40, respectively. During such relative cam yoke motion longitudinal alignment is maintained through the center to the yokes 29 and 39 with center opening 49 of cam yoke 39 sliding along shaft extension 26. At the same time the yokes 29 and 39 are restrained to planes of motion at substantially right angles by slots 38 of guide member 36.

Compact nesting between relatively movable cam yokes 29 and 39 is provided for by yoke slots 50 and 51, respectively. Such a cam yoke and cam member 33 arrangement advantageously employs only two slots each with upper and lower cam contours. Thus, machining required for shaping the cam contours is minimized, the cam mechanism is reduced in size and weight, and faster tuning may be provided with the smaller size and reduced weight of driven cam components.

Whereas this invention is here illustrated an described with respect to two specific embodiments thereof, it should be realized that various changes may be made without departing from the essential contributions to the art made by the teachings hereof.

We claim:

1. In a drive system for setting a device having input linkage working against unidirectional nonlinear biasing force characteristics imposed by the device through a range of operational settings; a first cylindrical member and a second cylindrical member assembled in concentric relation with bearing means for relative rotational movement; one of said cylindrical members being fixed to said device; means for driving the other cylindrical member; means mounting said drive means on the cylindrical member fixed to said device; first and second cam contours on one of said cylindrical members; first and second cam riders for riding along said first and second cam contours, respectively; said first cam rider being connected to the input linkage of said device and biased into riding engagement with said first cam contour by the biasing force of said device; unidirectional force biasing means for biasing said second cam rider into riding engagement with said second cam contour; and means in one of said cylindrical members for guiding said first and second cam riders.

2. The drive system for setting a device of claim 1 wherein, said first cam contour is shaped for providing desired drive seting motion characteristics to said input linkage for setting the device; said second cam contour being shaped and said unidirectional force biasing means being mated to said second cam contour for providing a force in opposition to the biasing force of said device which so varies through a range of operational settings that the remaining force resultant is substantially constant throughout such range of operational settings of the device.

3. The drive system for setting a device of claim 2 wherein, said first and second cam contours are so shaped and a force biasing means chosen for cooperation with said second cam contour for minimizing said force resultant in the drive system through a range of operational settings of the device.

4. In a drive system for setting a device having input linkage working against unidirectional nonlinear biasing force characteristics imposed throughout the range of operational settings by the device; a cylindrical cam member having a first cam contour and a second cam contour, a first cam rider and a second cam rider for following said first and second cam contours, respectively; a guide member rigidly mounted relative to said device and having means for guiding the motion of said first and second cam riders as they are driven by said cam member, said first cam rider being connected to the input linkage of said device for movement of said cam member to change the setting of said device and with the biasing force of said device being exerted through said first cam rider against said first cam contour; resilient means for continually biasing said second cam rider into riding contact with said second cam contour for providing a force resultant in said cam member in opposition to a force resultant imposed on said cam member by the biasing force of said device acting through said first cam rider, and wherein, said first and second cam contours are opposite sides of a slot provided in said cylindrical cam member, means is provided for moving said cylindrical cam member, said cylindrical cam member has duplicate slots with a pair of matched upper contours and a pair of matched lower contours; and said first cam rider being a cam yoke for balanced riding along one of said pair of matched contours and said second cam rider also being a cam yoke for balanced riding along the other pair of matched contours as said cylindrical cam member is driven in rotation.

References Cited in the file of this patent

UNITED STATES PATENTS

| | | |
|---|---|---|
| 2,440,674 | Bell | May 4, 1948 |
| 2,679,165 | Montgomery | May 25, 1954 |